(12) United States Patent
Sillén

(10) Patent No.: US 11,658,740 B2
(45) Date of Patent: May 23, 2023

(54) MONITOR OF OPTICAL FIBER

(71) Applicant: TELIA COMPANY AB, Solna (SE)

(72) Inventor: Torbjörn Sillén, Hägersten (SE)

(73) Assignee: TELIA COMPANY AB, Solna (SE)

(*) Notice: Subject to any disclaimer, the term of this patent is extended or adjusted under 35 U.S.C. 154(b) by 0 days.

(21) Appl. No.: 17/329,719

(22) Filed: May 25, 2021

(65) Prior Publication Data
US 2021/0376925 A1 Dec. 2, 2021

(30) Foreign Application Priority Data
May 27, 2020 (FI) .......................... 20205540

(51) Int. Cl.
*H04B 10/079* (2013.01)
*H04B 10/03* (2013.01)

(52) U.S. Cl.
CPC ......... *H04B 10/0793* (2013.01); *H04B 10/03* (2013.01); *H04B 10/0791* (2013.01); *H04B 10/07955* (2013.01)

(58) Field of Classification Search
None
See application file for complete search history.

(56) References Cited

U.S. PATENT DOCUMENTS

| | | | | |
|---|---|---|---|---|
| 5,943,147 A * | 8/1999 | Vanoli | ................. | H04J 14/0227 398/34 |
| 6,178,025 B1 * | 1/2001 | Hardcastle | ......... | H04B 10/0771 398/31 |
| 6,204,959 B1 * | 3/2001 | Fujita | ................. | H04B 10/0731 359/337.2 |
| 6,285,475 B1 * | 9/2001 | Fee | ..................... | H04B 10/0771 398/32 |
| 6,469,814 B1 * | 10/2002 | Park | ................. | H04B 10/07955 398/79 |
| 6,501,573 B1 * | 12/2002 | Lee | ..................... | H04B 10/077 398/154 |

(Continued)

FOREIGN PATENT DOCUMENTS

| CN | 107919995 A | 4/2018 |
|---|---|---|
| CN | 207732764 | 8/2018 |

(Continued)

OTHER PUBLICATIONS

Wikipedia, Narrowband IoT, 2018 (Year: 2018).*

(Continued)

*Primary Examiner* — Jai M Lee
(74) *Attorney, Agent, or Firm* — Nixon & Vanderhye

(57) ABSTRACT

Disclosed is a solution for monitoring an operation of an optical fiber. An arrangement for the purpose includes: an indicator device arranged to: receive, from an optical component, a sample of a signal conveyed in the communication channel; determine an indicator value indicative of an amount of light in the sample of the signal; and a computing device arranged to compare the indicator value to a reference value, and set a detection result to express either that the sample of the signal carries a predefined amount of light or the predefined amount of light is absent from the sample. Also disclosed is a method, a computing device, a computer program product and a communication system thereto.

9 Claims, 2 Drawing Sheets

(56) References Cited

U.S. PATENT DOCUMENTS

| | | | | |
|---|---|---|---|---|
| 6,560,008 | B1* | 5/2003 | Wada | H01S 3/1301 359/341.43 |
| 6,583,899 | B1* | 6/2003 | Casanova | H04B 10/07955 398/9 |
| 6,623,185 | B1* | 9/2003 | Peragine | H04B 10/07955 398/24 |
| 6,987,922 | B2* | 1/2006 | Bierman | H04B 10/07955 385/140 |
| 7,006,765 | B2* | 2/2006 | Hendow | H04Q 11/0062 398/34 |
| 7,127,165 | B2* | 10/2006 | Obeda | H04B 10/07955 398/79 |
| 7,187,862 | B2* | 3/2007 | Mahlab | H04J 14/0246 398/31 |
| 8,009,987 | B2* | 8/2011 | Uchiyama | H04B 10/07955 398/43 |
| 9,876,601 | B2* | 1/2018 | Tanaka | H04B 10/564 |
| 10,277,312 | B2* | 4/2019 | Xue | H04B 10/079 |
| 10,374,701 | B2* | 8/2019 | Oda | H04B 10/07953 |
| 10,554,297 | B2* | 2/2020 | Snawerdt | H04B 10/85 |
| 10,623,095 | B2* | 4/2020 | Satou | H04J 14/02 |
| 10,666,354 | B2* | 5/2020 | Satou | H04B 10/079 |
| 11,128,380 | B2* | 9/2021 | Matsumoto | H04B 10/294 |
| 2007/0047875 | A1* | 3/2007 | Sezerman | H04B 10/0795 385/48 |
| 2008/0152358 | A1* | 6/2008 | Uto | H04B 10/695 398/1 |
| 2009/0161557 | A1 | 6/2009 | Macias | |
| 2012/0002962 | A1* | 1/2012 | Tosaki | H04J 14/0221 398/34 |
| 2016/0352449 | A1* | 12/2016 | Honda | H04J 14/0221 |
| 2017/0033862 | A1 | 2/2017 | Dupuis et al. | |
| 2018/0198521 | A1* | 7/2018 | Satou | H04J 14/00 |
| 2020/0099445 | A1 | 3/2020 | Storey et al. | |

FOREIGN PATENT DOCUMENTS

| | | |
|---|---|---|
| CN | 208849773 | 5/2019 |
| EP | 3 522 397 | 8/2019 |
| KR | 10-2018-0007186 | 1/2018 |
| WO | 02/075972 A1 | 9/2002 |

OTHER PUBLICATIONS

Search Report for FI20205540, dated Nov. 27, 2020, 2 pages.
European Search Report issued in European Patent Application No. 21175142.5 dated Oct. 19, 2021.
Qu et al., "Application of NB-IoT Technology in Fault Monitoring of Power Communication Optical Cable," 2019 IEEE 2nd International Conference on Information Systems and Computer Aided Education (ICISCAE), IEEE, Sep. 28, 2019, pp. 539-543, XP033762760.

* cited by examiner

MONITOR OF OPTICAL FIBER

This application claims priority to FI Patent Application No. 20205540 filed 27 May 2020, the entire contents of which is hereby incorporated by reference.

TECHNICAL FIELD

The invention concerns in general the technical field of telecommunications. More particularly, the invention concerns monitoring of a communication connection.

BACKGROUND

More and more communication channels are implemented with optical fibers. Especially, the optical fibers have become more common also in residential areas in order to improve communication capabilities of a communication network. The telecom operators may monitor an operation of the communication network implemented with optical fibers until a fiber distribution hub, but the monitoring of the last mile is difficult.

A document US 2017/0033862 A1 discloses an example of a prior art solution for monitoring faults occurring in an optical fiber. The solution is based on a solution wherein redundant detectors are arranged to determine parameters from a received signal so as to evaluate if the optical fiber operates as expected or not.

The solutions based on redundant technologies may be operable as such, but the problem with them is that they are typically expensive to implement, and they do not typically provide a way to conclude a root reason for the failure. Hence, there is need to develop further solutions for monitoring an operation of optical fibers, especially in the last mile, which solutions may mitigate drawbacks of the solutions according to prior art at least in part.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present an arrangement, a method, a computing device, a computer program product, and a communication system for monitoring an operation of an optical fiber.

The objects of the invention are reached by an arrangement, a method, a computing device, a computer program product, and a communication system as defined by the respective independent claims.

According to a first aspect, an arrangement for monitoring an operation of an optical fiber is provided, the arrangement comprising: an indicator device arranged to: receive, from an optical component arranged in a communication channel of the optical fiber, a sample of a signal conveyed in the communication channel; determine, on a basis of the sample, an indicator value indicative of an amount of light in the sample of the signal; and the arrangement further comprising a computing device arranged to: compare the indicator value to a reference value, and set, in accordance with a comparison between the indicator value and the reference value, a detection result to express one of the following: (i) the sample of the signal carries a predefined amount of light, (ii) the predefined amount of light is absent from the sample.

The arrangement may further comprise: a communication part for generating a signal to a communication network to deliver information on the detection result. For example, the communication part may be arranged to generate the signal over a communication channel established with a Narrow Band Internet of Things radio technology.

Still further, the indicator device of the arrangement may be arranged to determine the indicator value by transforming the sample of the signal being in an optical form to an electrical signal.

The indicator device of the arrangement may be arranged to receive the sample of the signal conveyed in the communication channel by one of: in a continuous manner; at predefined intervals.

The arrangement may further comprise the optical component.

According to a second aspect, a method for monitoring an operation of an optical fiber is provided, the method, performed by an arrangement, comprises: receiving, from an optical component arranged in a communication channel of the optical fiber, a sample of a signal conveyed in the communication channel; determining, on a basis of the sample, an indicator value indicative of an amount of light in the sample of the signal; comparing the indicator value to a reference value; and setting, in accordance with a comparison between the indicator value and the reference value, a detection result to express one of the following: (i) the sample of the signal carries a predefined amount of light, (ii) the predefined amount of light is absent from the sample.

The method, performed by the arrangement, may further comprise: generating a signal to a communication network to deliver information on the detection result.

For example, the signal may be generated over a communication channel established with a Narrow Band Internet of Things radio technology.

The indicator value may be determined by transforming the sample of the signal being in an optical form to an electrical signal.

The sample of the signal conveyed in the communication channel may be received by one of: in a continuous manner; at predefined intervals.

According to a third aspect, a computing device for monitoring an operation of an optical fiber is provided, the computing device comprises: at least one processor; at least one memory including computer program code; the at least one memory and the computer program code configured to, with the at least one processor, cause the computing device to perform: compare an indicator value to a reference value, the indicator value being indicative of an amount of light in a sample of a signal conveyed in the optical fiber; and set, in accordance with a comparison between the indicator value and the reference value, a detection result to express one of the following: (i) the sample of the signal carries a predefined amount of light, (ii) the predefined amount of light is absent from the sample.

According to a fourth aspect, a computer program product for monitoring an operation of an optical fiber which, when executed by at least one processor, cause a computing device to perform: compare an indicator value to a reference value, the indicator value being indicative of an amount of light in a sample of a signal conveyed in the optical fiber; and set, in accordance with a comparison between the indicator value and the reference value, a detection result to express one of the following: (i) the sample of the signal carries a predefined amount of light, (ii) the predefined amount of light is absent from the sample.

According to a fifth aspect, a communication system is provided, the communication system comprising: a network device communicatively connected with an optical fiber to a network node; and an arrangement according to the first aspect as defined above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically a communication system into which an arrangement according to an example embodiment is implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
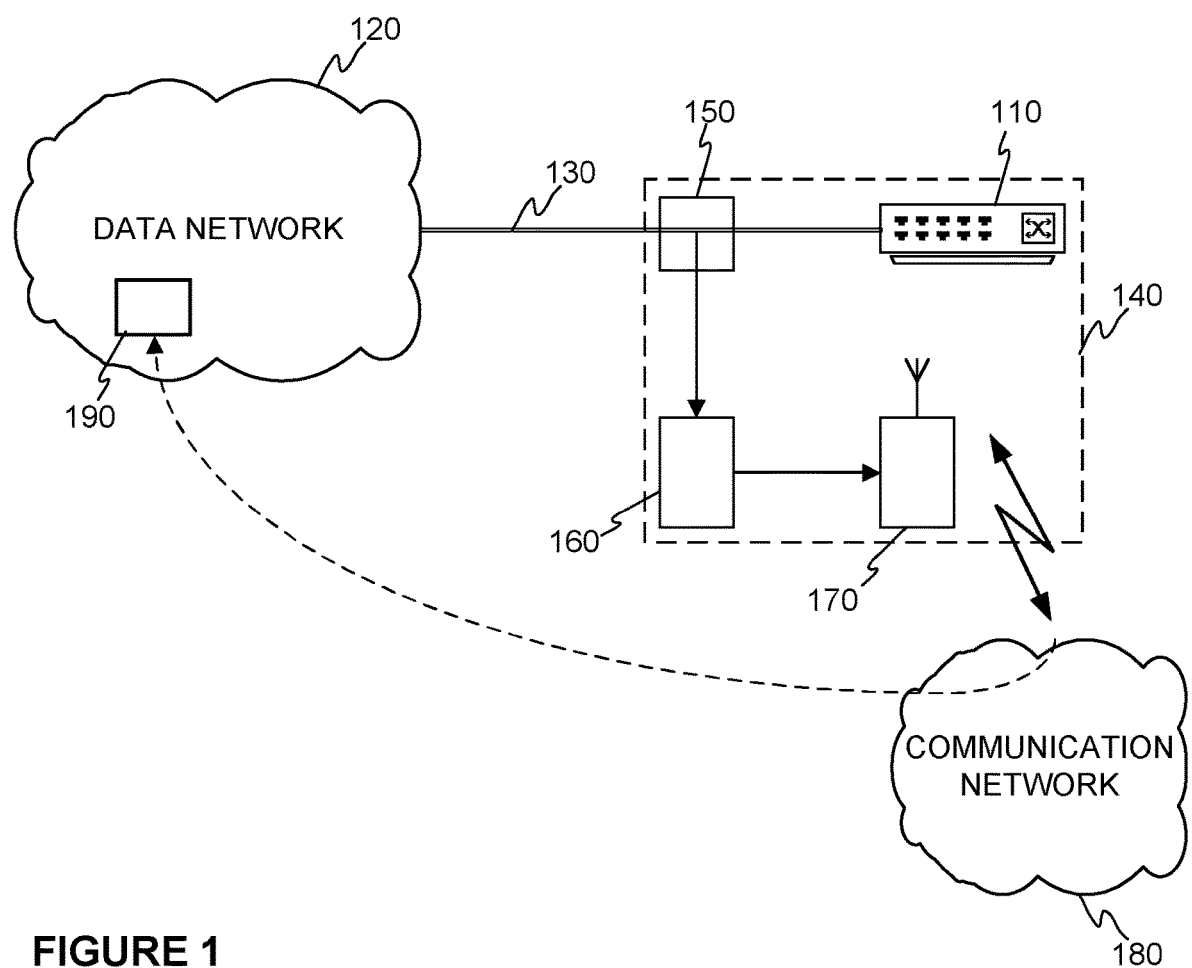

FIG. 1 illustrates schematically a communication system into which an arrangement according to an example embodiment is implemented to. The arrangement may be implemented to the communication system in which a network device 110 is communicatively connected to a data network 120, such as to a network node, like a server device, therein, with an optical fiber 130. As some non-limiting examples of the network device 110 it may be mentioned a switch, a router, a mobile base station, or so called DWDM (Dense Wavelength Division Multiplexing) equipment. In general it may be considered that it is a device e.g. residing in residential premises for enabling a connection to the data network 120, such as to IP (Internet Protocol) network, MPLS (Multiprotocol Label Switching) network, or DWDM (Dense Wavelength Division Multiplexing) network. The box 140 drawn with dashed lines refers to that the arrangement in accordance with at least some example embodiments may be implemented locally to the same communication end as wherein the network device 110 is arranged to operate. This may correspond to so-called last mile concept enabling a monitoring of a status of the optical fiber in the last mile.

The optical fiber 130 may be accessed, or equipped, with an optical component 150 by means of which it is possible to access a signal conveyed in the optical fiber 130. The access of the signal may refer to at least such an implementation that at least a portion of the signal, i.e. light, conveyed in a communication channel, or in a communication path, established with the optical fiber 130 is separated for monitoring purposes, as is described in the forthcoming description. The separation may e.g. be performed with an optical component 150 configured to filter the portion of the light from the signal, such as a passive optical filter. The portion may be output from a monitoring port of the respective optical component 150, for example. The portion of light separated from the original signal may refer to a predefined amount of light, such as 5% of the original signal. Advantageously, the amount of light separated from the original signal may be optimized so that it does not disturb a quality of the communication experienced at the network device 110, or any device behind the network device 110. For sake of clarity it is worthwhile to mention that the optical component 150 may belong to the communication channel or to the network device 110, or it may be arranged in the communication channel as a separate device. In some example embodiments it may be considered that the optical component 150 belongs to the arrangement in accordance with example embodiments, especially if the communication system does not comprise an applicable device from which the portion of the light may be directly obtained.

In accordance to at least some embodiments the arrangement may comprise an indicator device 160 which is arranged to receive a sample of a signal conveyed in the communication channel. The term sample corresponds to the portion of the light at least in one instant of time, such as to consecutive samples obtained from the portion of the light. Depending on the implementation the sample may be obtained from the optical component 150 in response to a control signal generated to the optical component 150, which may cause e.g. filtering the portion of the light for the further purpose. Such an implementation may be arranged if the optical component is a component whose operation may be controlled with a control signal. Alternatively or in addition, the portion of the signal may be obtained in a continuous manner so as to enabling the sampling from the signal for further use. The sampling rate may be determined. As said, in some example embodiments the indicator device 160 may receive the sample in a continuous manner i.e. the sample refers to a continuous signal corresponding to the portion of light separated from the original signal.

In response to a receipt of the sample the indicator device 160 may be arranged to generate one or more indicator values indicative of an amount of light in the sample of the signal. In other words, the indicator values generated by the indicator device 160 represent an amount of light in the signal, i.e. the portion of the light, separated from the original signal by the optical component 150. For example, the indicator device 160 may be arranged to operate so that the indicator value is zero if the sample does not comprise light and if light may be detected from the sample, the indicator value deviates from zero, such as being a constant value or varies in accordance with the amount of light in the sample. The indicator device 160 may refer to an implementation having a connector for an optical fiber conveying the portion of light from the optical component 150 and a device for converting the optical signal, i.e. the portion of light, to electrical signal. An example of an applicable device may be so-called receiver optical sub-assembly which is a device designed to convert the optical signal to electrical signal. The indicator device may comprise further devices, or components, such as applicable amplifiers for amplifying the electrical signal from the device converting the optical signal to the electrical signal. Additionally, the amplifier, or the further device, may be arranged to perform a conversion of the electrical signal from one form to another form, such as from current to voltage, e.g. when the indicator device 160 comprises, as a device to convert the optical signal to the electrical signal, a Geiger-Müller tube, a photo multiplier tube, an accelerometer, a photo detector, or any similar outputting the signal as current. A non-limiting example of an applicable device for amplifying the signal and converting the electrical signal from one for to another may be mentioned so-called trans-impedance amplifier. In any case, the indicator device 160 is arranged to perform at least the conversion of the optical signal to an electrical signal suitable to be analyzed as is described in the forthcoming description.

Namely, the arrangement may comprise a computing device 170 which is arranged to receive, as an input, the electrical signal, i.e. the indicator value, from the indicator device 160. The indicator value may be compared to a reference value accessible by the computing device 170. In accordance with an example embodiment the reference value may be defined so that a result of the comparison may be interpreted to indicate if the sample conveys light or not. For example, the reference value may be set to be zero i.e. corresponding to a situation that the light is absent from the sample. Hence, in such a situation the computing device 170 may be arranged to set a detection result to express that the sample does not carry a predefined amount of light. On the other hand, if the indicator value deviates from zero, a detection result may be set to indicate that the sample of the signal, like the monitored portion of the original signal, carries a pre-defined amount of light. In some example embodiments the reference value may be set so that a predefined margin may be taken into account so as to perform the comparison by mitigating errors. For sake of clarity it is worthwhile to mention that the predefined amount of light may correspond to a situation in which the sample contains any light.

Moreover, the arrangement may comprise a communication part suitable for arranging a communication between the computing device 170 and a network node, such as a server device, accessible through a communication network the communication part is connectable to. In the non-limiting example as illustrated in FIG. 1 the communication part is implemented in the computing device, but it may also be a separate entity to the computing device 170. The communication from the communication part may advantageously be implemented in a wireless manner. For example, the communication network 180 may be a mobile communication network wherein the communication part may be provided with an applicable subscription to the communication network 180 if necessary. Due to a nature of the example embodiment the communication to the mobile communication network may advantageously be performed with predefined messages, such as by applying a short message service (SMS). The communication part may, in the context of some example embodiments, refer to a wireless communication module configured to implement a radio interface to the communication network. For example, the radio interface may be defined in accordance with 3G, 4G or 5G wireless standards. For example, a communication channel for delivering information e.g. in the message from the communication part to the communication network 180 may be established with a Narrow Band Internet of Things radio technology. The message received by the communication network 180 may be delivered, based on a destination address, such as a MSISDN number given in the message, to the network node 190 e.g. residing in the data network 120, such as in Internet. The delivery of the message refers to an arrangement that the communication network 180 may transform the received message into another form and generate signalling, e.g. over Internet Protocol, towards the data network 120 for conveying the information. The network node 190, such as a server device, may be arranged to perform a monitoring operation of the communication network implemented with optical fibers, and in response to a receipt of an indication that the optical fiber 130 in question does not operate properly to generate a notification, such as a service request. Naturally, the network node 190 receiving the messages may be reside in some other network as the one as schematically illustrated in FIG. 1 or even be reachable directly by the communication part.

For sake of completeness in some example embodiments the communication may be arranged so that the message, or any similar communication, is generated towards the network node 190 when it is detected with the arrangement that the optical fiber carries light at least the predetermined amount. Hence, the maloperation may be concluded by the network node 190 in response to a detection that no information representing the status of the optical fiber is anymore received.

As already mentioned, the computing device 170 may be arranged to perform the analysis function as well as comprise the communication part as described above. As a non-limiting example of the computing device 170 may be mentioned a mobile terminal which is arranged to execute an application performing the operation as described in accordance with an input signal received from the indicator device 160. Naturally, in some example embodiments the indicator device 160 may be housed in the same housing with the computing device 170.

Figure 2:
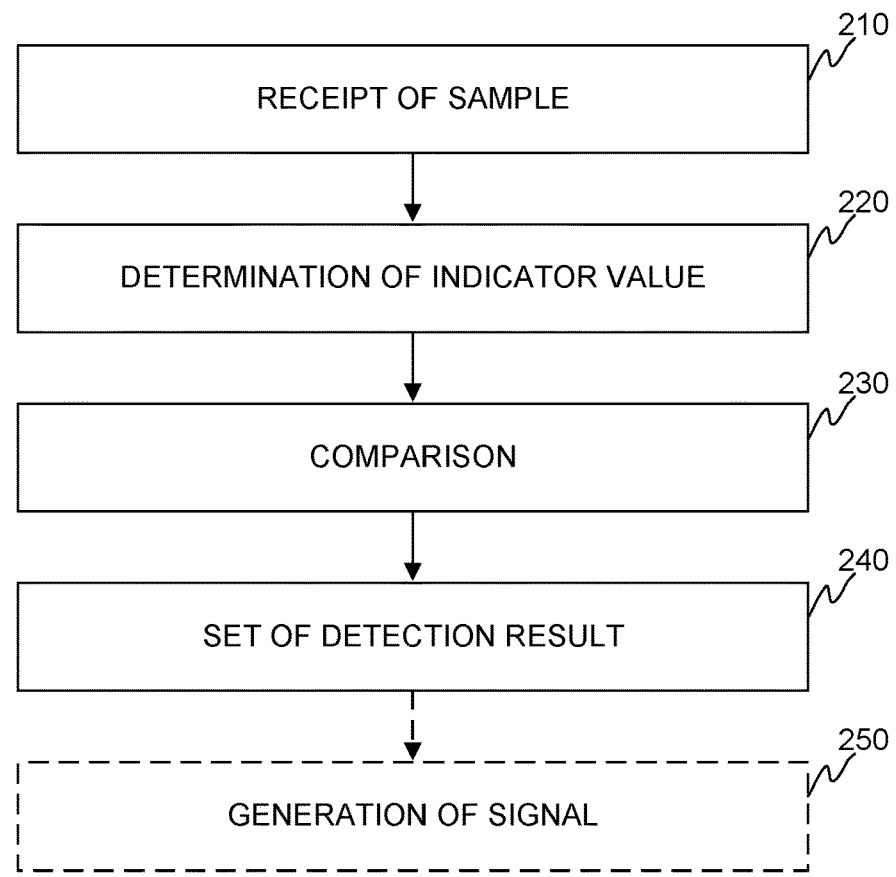
FIG. 2 illustrates schematically a method according to an example embodiment.

FIG. 2 illustrates schematically a method according to an example embodiment for monitoring an operation of an optical fiber 130 by the arrangement as described. The method may comprise that a sample of a signal conveyed in a communication channel is received 210 from an optical component 150 arranged in the communication channel implemented with an optical fiber 130. The sample may refer to a portion of the signal, i.e. portion of the light, separated from the original signal conveyed in the fiber 130. Naturally, in case no signal is conveyed in the optical fiber 130, no portion of the signal may be separated from the original signal. Next, it may be determined 220, on a basis of the sample, an indicator value indicative of an amount of light in the sample of the signal. The determination 220 of the indicator value may e.g. be performed with an indicator device 160 of the arrangement in a manner as described in a context of the FIG. 1. The indicator value may be input to the computing device 170 of the arrangement, which may be arranged to perform a comparison 230 of the indicator value to a reference value. Finally, a detection result 240 may be set setting, in accordance with the comparison between the indicator value and the reference value wherein the detection result is set to express one of the following: (i) the sample of the signal carries a predefined amount of light, (ii) the predefined amount of light is absent from the sample.

In accordance with some further embodiment the computing device 170 of the arrangement may be arranged to generate 250 a signal to a communication network 180 to deliver information on the detection result. The delivery of the information may e.g. be performed only if the detection result is a selected one of the following: (i) the sample of the signal carries a predefined amount of light, (ii) the predefined amount of light is absent from the sample, or always. The generation of the signal shall e.g. be understood to cover an establishment of the signal with necessary information indicating the detection result as well as a delivery of the signal over a communication technology implemented by the communication part of the arrangement.

Figure 3:
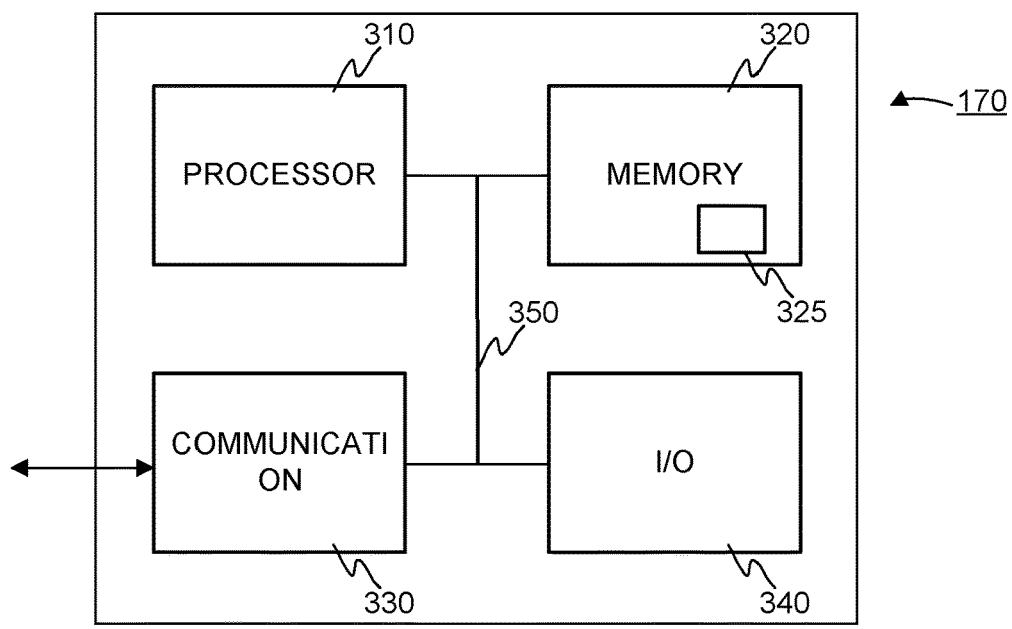
FIG. 3 illustrates schematically a computing device according to an example embodiment.

As discussed in the foregoing description, a computing device 170 may be arranged to perform at least part of the monitoring of an operation of the optical fiber in the manner as described. FIG. 3 illustrates schematically as a block diagram a non-limiting example of the computing device 170 applicable to perform the method, at least in part. The block diagram of FIG. 3 depicts some components of an apparatus that may be employed to implement an operation of the computing device 170. The apparatus comprises a processor 310 and a memory 320. The memory 320 may store data and computer program code 325. The apparatus may further comprise communication means 330 for wired and/or wireless communication with other apparatuses, such as with network nodes as well as databases and any other entities. The communication means 330 may perform the functionality of the communication part as described in the foregoing description which means that the communication means may correspond to a wireless communication module, for example. Furthermore, I/O (input/output) components 340 may be arranged, together with the processor 310 and a portion of the computer program code 325, to provide a user interface for receiving input from a user and/or providing output to the user of the system and the computing device 170 when necessary. In particular, the user I/O components may include user input means, such as one or more keys or buttons, a keyboard, a touchscreen, or a touch-pad, etc. The user I/O components may include output means, such as a dis-play or a touchscreen. The components of the apparatus may be communicatively coupled to each other via a bus 350 that enables transfer of data and control information between the components.

The memory 320 and a portion of the computer program code 325 stored therein may be further arranged, with the processor 310, to cause the apparatus, i.e. the computing device 170 to perform a method as described in the foregoing description. The processor 310 may be configured to read from and write to the memory 320. Although the processor 310 is depicted as a respective single component, it may be implemented as respective one or more separate processing components. Similarly, although the memory 320 is depicted as a respective single component, it may be implemented as respective one or more separate components, some or all of which may be integrated/removable and/or may provide permanent/semi-permanent/dynamic/cached storage.

The computer program code 325 may comprise computer-executable instructions that implement functions that correspond to steps of the method when loaded into the processor 310. As an example, the computer program code 325 may include a computer program consisting of one or more sequences of one or more instructions. The processor 310 is able to load and execute the computer program by reading the one or more sequences of one or more instructions included therein from the memory 320. The one or more sequences of one or more instructions may be configured to, when executed by the processor 310, cause the apparatus to perform the method be described. Hence, the apparatus may comprise at least one processor 310 and at least one memory 320 including the computer program code 325 for one or more programs, the at least one memory 320 and the computer program code 325 configured to, with the at least one processor 310, cause the apparatus to perform at least a part of the method as described.

The computer program code 325 may be provided e.g. a computer program product comprising at least one computer-readable non-transitory medium having the computer program code 325 stored thereon, which computer program code 325, when executed by the processor 310 causes the apparatus to perform the method at least in part. The computer-readable non-transitory medium may comprise a memory device or a record medium such as a CD-ROM, a DVD, a Blu-ray disc, or another article of manufacture that tangibly embodies the computer program. As another example, the computer program may be provided as a signal configured to reliably transfer the computer program.

Still further, the computer program code 325 may comprise a proprietary application, such as computer program code for executing the monitoring at least in part the manner as described.

Any of the programmed functions mentioned may also be performed in firmware or hardware adapted to or programmed to perform the necessary tasks.

The invention described as example embodiments in the foregoing description provides a simple as well as a cost-effective way to monitor an operation of an optical fiber, especially in the so-called last mile. With the solution it is possible to detect any maloperation in the optical fiber in an efficient way and initiate maintenance operations to keep a customer satisfaction in a high level from a service provider's, such as a telecom operator, point of view.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An arrangement for monitoring an operation of an optical fiber, the arrangement comprises:
    an optical component arranged in a communication channel of the optical fiber, the optical component being controlled by a control signal,
    an indicator device arranged to
    receive, from the optical component arranged in a communication channel of the optical fiber, a sample of a signal conveyed in the communication channel, wherein the control signal controls the optical component so that the sample is obtained in a non-continuous manner from the optical component in response to the control signal being generated to control the optical component, and
    determine, on a basis of the sample, an indicator value indicative of an amount of light in the sample of the signal,
    a computing device arranged to
    compare the indicator value to a reference value, the reference value being a constant value, and
    set, in accordance with a comparison between the indicator value and the reference value, a detection result to express one of the following: (i) the sample of the signal carries a predefined amount of light, (ii) the predefined amount of light is absent from the sample, and a communication part arranged to generate a signal to a communication network to deliver information on the detection result, wherein the signal is generated over a communication channel established with a Narrow Band Internet of Things radio technology.

2. The arrangement of claim 1, wherein the indicator device of the arrangement is arranged to determine the indicator value by transforming the sample of the signal being in an optical form to an electrical signal.

3. The arrangement of claim 1, wherein the indicator device of the arrangement is arranged to receive the sample of the signal conveyed in the communication channel by one of: in a continuous manner; at predefined intervals.

4. A communication system, comprising:
   a network device communicatively connected with an optical fiber to a network node, and
   an arrangement according to claim 1.

5. A method for monitoring an operation of an optical fiber, the method, performed by an arrangement, comprises:
   receiving, from an optical component arranged in a communication channel of the optical fiber, a sample of a signal conveyed in the communication channel, wherein a non-continuous control signal is generated to control the optical component so that the sample is obtained in a non-continuous manner from the optical component in response to the control signal generated to control the optical component,
   determining, on a basis of the sample, an indicator value indicative of an amount of light in the sample of the signal,
   comparing the indicator value to a reference value, the reference value being a constant value,
   setting, in accordance with a comparison between the indicator value and the reference value, a detection result to express one of the following: (i) the sample of the signal carries a predefined amount of light, (ii) the predefined amount of light is absent from the sample, and
   generating a signal to a communication network to deliver information on the detection result, wherein the signal is generated over a communication channel established with a Narrow Band Internet of Things radio technology.

6. The method of claim 5, wherein the indicator value is determined by transforming the sample of the signal being in an optical form to an electrical signal.

7. The method of claim 5, wherein the sample of the signal conveyed in the communication channel is received by one of: in a continuous manner; at predefined intervals.

8. A computing device for monitoring an operation of an optical fiber, the computing device comprises:
   at least one processor;
   at least one memory including computer program code;
   the at least one memory and the computer program code configured to, with the at least one processor, cause the computing device to:
   compare an indicator value to a reference value, the reference value being a constant value, the indicator value being indicative of an amount of light in a sample of a signal conveyed in the optical fiber, wherein a non-continuous control signal controls an optical component arranged in a communication channel of the optical fiber so that the sample is obtained in a non-continuous manner from the optical component in response to the control signal generated to control the optical component,
   set, in accordance with a comparison between the indicator value and the reference value, a detection result to express one of the following: (i) the sample of the signal carries a predefined amount of light, (ii) the predefined amount of light is absent from the sample, and
   generate a signal to a communication network to deliver information on the detection result, wherein the signal is generated over a communication channel established with a Narrow Band Internet of Things radio technology.

9. A non-transitory computer-readable medium on which is stored a computer program for monitoring an operation of an optical fiber which, when executed by at least one processor, causes a computing device to:
   compare an indicator value to a reference value, the reference value being a constant value, the indicator value being indicative of an amount of light in a sample of a signal conveyed in the optical fiber, wherein a non-continuous control signal controls an optical component arranged in a communication channel of the optical fiber so that the sample is obtained in a non-continuous manner from the optical component in response to the control signal generated to control the optical component,
   set, in accordance with a comparison between the indicator value and the reference value, a detection result to express one of the following: (i) the sample of the signal carries a predefined amount of light, (ii) the predefined amount of light is absent from the sample, and
   generate a signal to a communication network to deliver information on the detection result, wherein the signal is generated over a communication channel established with a Narrow Band Internet of Things radio technology.

* * * * *